United States Patent
Zhu et al.

(10) Patent No.: US 8,355,340 B2
(45) Date of Patent: Jan. 15, 2013

(54) METHOD AND BASE STATION FOR OBTAINING CHANNEL QUALITY INDICATOR INFORMATION

(75) Inventors: Jianchi Zhu, Beijing (CN); Xiaoming She, Beijing (CN); Xiang Yun, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 373 days.

(21) Appl. No.: 12/821,044

(22) Filed: Jun. 22, 2010

(65) Prior Publication Data
US 2011/0032835 A1     Feb. 10, 2011

(30) Foreign Application Priority Data
Aug. 5, 2009    (CN) .................... 2009 1 0161865

(51) Int. Cl.
*H04L 1/20*      (2006.01)
*H04B 1/10*      (2006.01)

(52) U.S. Cl. ................. 370/252; 455/63.1; 455/501

(58) Field of Classification Search .............. 370/252
See application file for complete search history.

(56) References Cited

U.S. PATENT DOCUMENTS

| | | | | |
|---|---|---|---|---|
| 8,165,619 B2* | 4/2012 | Attar et al. | ............ | 455/522 |
| 2008/0316935 A1* | 12/2008 | Bala et al. | ............ | 370/252 |
| 2010/0035555 A1* | 2/2010 | Bala et al. | ............ | 455/63.1 |
| 2010/0067396 A1* | 3/2010 | Cui et al. | ............ | 370/252 |

OTHER PUBLICATIONS

Jianchi Zhu et al., Adaptive CQI Feedback and Efficient CQI Update Scheme for Codebook Based MU-MIMO in E-UTRA, Vehicular Technology Conference, 2008. VTC 2008-Fall. IEEE 68th, p. 1-6.*

* cited by examiner

*Primary Examiner* — Michael Thier
*Assistant Examiner* — Brian Cox
(74) *Attorney, Agent, or Firm* — Blakely, Sokoloff, Taylor & Zafman LLP

(57) ABSTRACT

Embodiments of the present invention include a method and base station for obtaining Channel Quality Indicator (CQI) information. One embodiment of the method includes: receiving, by a base station, quantized channel information, quantization error, Inter-Cell Interference (ICI) power and noise power fed back by each User Equipment (UE) after channel estimation; and estimating, by the base station, a CQI corresponding to each UE to obtain an estimated CQI value corresponding to each UE according to the quantized channel information, the quantization error, the ICI power and the noise power which are fed back by the UE as well as an instantaneous precoding vector or matrix of each UE. Through the embodiments, the base station can obtain more precise CQI information of each UE so as to select a precise modulation and coding scheme and to increase system throughput.

14 Claims, 3 Drawing Sheets

METHOD AND BASE STATION FOR OBTAINING CHANNEL QUALITY INDICATOR INFORMATION

PRIORITY

The present application claims priority to and incorporates by reference the entire contents of Chinese patent application No. 200910161865.5, filed in China on Aug. 5, 2009.

FIELD OF THE INVENTION

The present invention relates to wireless communication techniques, and more particularly, to a method for obtaining Channel Quality Indicator (CQI) information based on limited feedback and quantized channel feedback at a base station and the base station for implementing the method in a Multi-User-Multiple-Input Multiple-Output (MU-MIMO) system.

BACKGROUND OF THE INVENTION

In an MU-MIMO system based on limited feedback and quantized channel feedback, during a multi-user scheduling process, a base station usually needs to receive a CQI fed back by each User Equipment (UE) firstly, and then selects a Modulation and Coding Scheme (MCS) for each UE according to the CQI fed back by the UE. Because each UE does not know precoding vectors (matrixes) of other UEs, each UE cannot consider an impact of a precoding vector (matrix) of each UE on multi-user interference during a CQI calculation process. Therefore, the CQI fed back by each UE to the base station is inaccurate, which makes the base station unable to select a precise MCS for each UE. In view of the above, how the base station in the MU-MIMO system obtains precise CQI information of each UE becomes one of problems to be solved in multi-user scheduling in the MU-MIMO system.

SUMMARY OF THE INVENTION

To solve the above problem, embodiments of the present invention include a method for obtaining Channel Quality Indicator (CQI) information and a base station, which can obtain precise CQI information corresponding to each UE and thereby select a precise MCS for each UE and increase system throughput.

According to an embodiment of the present invention, a method for obtaining Channel Quality Indicator (CQI) information includes:

receiving, by a base station, quantized channel information, quantization error, Inter-Cell Interference (ICI) power and noise power fed back by each User Equipment (UE) after channel estimation; and estimating, by the base station, a CQI corresponding to each UE to obtain an estimated CQI value corresponding to the UE according to the quantized channel information, the quantization error, the ICI power and the noise power which are fed back by the UE as well as an instantaneous precoding vector of each UE.

According to another embodiment of the present invention, a base station includes:

a channel information receiving unit to receive quantized channel information, quantization error, Inter-Cell Interference (ICI) power and noise power which are fed back by each User Equipment (UE); and a Channel Quality Indicator (CQI) estimation unit to estimate a CQI corresponding to each UE according to the quantized channel information, the quantization error, the ICI power and the noise power which are fed back by the UE as well as an instantaneous precoding vector or an instantaneous precoding matrix of each UE; and obtain an estimated CQI value corresponding to each UE.

According to the method and base station for obtaining CQI information in embodiments of the present invention, the base station estimates a CQI corresponding to each UE, and considers an impact of the precoding vector (matrix) of each UE on the multi-user interference when estimating the CQI of each UE. Therefore, compared with the conventional method, the estimated CQI value obtained in the present invention is closer to the real CQI of each UE. Thus, in the subsequent process, a base station can select a precise MCS for each UE using the estimated CQI value which is closer to the real CQI, so as to increase system throughput.

BRIEF DESCRIPTION OF THE DRAWINGS

Exemplary embodiments of the present invention will be hereinafter described in detail with reference to accompanying drawings so as to make features and merits of the present invention clearer to those skilled in the art, in the drawings.

DETAILED DESCRIPTION OF THE INVENTION

Figure 1:
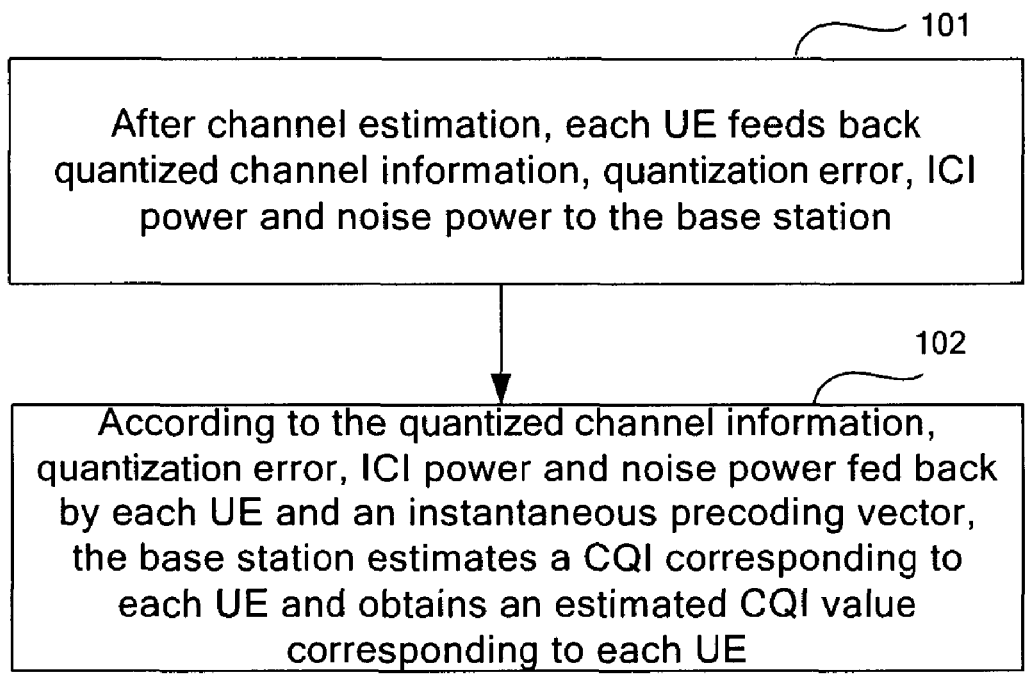
FIG. 1 is a flowchart of a method for obtaining CQI information according to an embodiment of the present invention.

An embodiment of the present invention provides a method for obtaining CQI information. As shown in FIG. 1, the method mainly includes:

Step 101: After performing channel estimation, each UE in a MU-MIMO system feeds back quantized channel information, quantization error, Inter-Cell Interference (ICI) power and noise power of the UE to a base station of the MU-MIMO system.

In a Long Term Evolution (LTE) or Long Term Evolution-Advanced (LTE-A) system, the UE may feed back parameters, such as the quantized channel information, the quantization error, the ICI power and the noise power, to the base station through a Physical Uplink Control Channel (PUCCH) or Physical Uplink Shared Channel (PUSCH). The quantization error may be a channel quantization error angle calculated by the UE according to real channel information and the quantized channel information of the UE.

Preferably, the quantized channel information may be a quantized channel vector (matrix) or a quantized channel singular vector (matrix).

Step 102: According to the quantized channel information, the quantization error, the ICI power and the noise power which are fed back by each UE, as well as an instantaneous precoding vector (matrix) of each UE, the base station estimates a CQI corresponding to each UE and obtains an estimated CQI value corresponding to each UE.

In practical applications, the base station may obtain the instantaneous precoding vector (matrix) of each UE through different precoding methods, e.g. through a Zero-Forcing (ZF) precoding method or a Block Diagonalization (BD) precoding method.

In the method for obtaining the CQI in the above embodiment, the estimation of the CQI corresponding to each UE is performed by the base station. And an impact of the precoding vector (matrix) of each UE on the multi-user interference is taken into consideration when estimating the CQI of each UE. Meanwhile, because the channel information fed back by each UE has been quantized, in order to reduce an impact of the quantization error on the CQI estimation, the base station further considers the quantization error of the channel when estimating the CQI of each UE. Therefore, compared with the conventional method, the estimated CQI value obtained in the present invention is closer to the real CQI of each UE. Thus, in subsequent process, the base station can select a precise MCS for each UE using the estimated CQI value which is closer to the real CQI, so as to increase system throughput.

Specifically, if the quantized channel information fed back by the UE is the quantized channel vector (matrix), according to an embodiment of the present invention, the base station may calculate the CQI of the UE in Step 102 according to a following equation (1):

$$CQI_k = \frac{\|\hat{h}_k \cdot w_k\|^2}{ICI + \sigma^2 + \|\hat{h}_k\|^2 \sum_{i=k}^{K} \|w_i\|^2 \sin^2\theta_k} \quad (1)$$

wherein, $CQI_k$ denotes an estimated CQI value corresponding to the $k^{th}$ UE; $\hat{h}_k$ denotes a quantized channel vector (matrix) of the $k^{th}$ UE; $w_k$ denotes a precoding vector (matrix) of the $k^{th}$ UE; ICI denotes inter-cell interference power fed back by the $k^{th}$ UE; $\sigma^2$ denotes noise power fed back by the $k^{th}$ UE; $\theta_k$ denotes a channel quantization error angle fed back by the $k^{th}$ UE, it may be calculated by the $k^{th}$ UE according to a following equation (2), in which K denotes the total number of UEs:

$$\cos\theta_k = \frac{\|h_k^H \cdot \hat{h}_k\|}{\|h_k\|\|\hat{h}_k\|} \quad (2)$$

wherein, $h_k$ denotes the channel vector (matrix) of the $k^{th}$ UE; $h_k^H$ is a conjugate transpose of $h_k$.

If the quantized channel information fed back by the UE is the quantized channel singular vector (matrix), according to another embodiment of the present invention, the base station may calculate the CQI of the UE in the Step 102 according to a following equation (3):

$$CQI_k = \frac{\lambda_k^2 \cdot \|\hat{v}_k \cdot w_k\|^2}{ICI + \sigma^2 + \sum_{i \neq k}^{K} \|w_i\|^2 \sin^2\theta_k} \quad (3)$$

wherein, $CQI_k$ denotes an estimated CQI value corresponding to the $k^{th}$ UE; $\hat{v}_k$ denotes a quantized singular vector of the channel vector (matrix) $h_k$ corresponding to the $k^{th}$ UE; $\lambda_k$ denotes a singular value corresponding to the $k^{th}$ UE; $w_k$ denotes a precoding vector (matrix) of the $k^{th}$ UE; ICI denotes inter-cell interference power fed back by the $k^{th}$ UE; $\sigma^2$ denotes noise power fed back by the $k^{th}$ UE; $\theta_k$ denotes a channel quantization error angle fed back by the $k^{th}$ UE, it may be calculated by the $k^{th}$ UE according to a following equation (4); K denotes the total number of UEs.

$$\cos\theta_k = \frac{\|v_k^H \cdot \hat{v}_k\|}{\|v_k\|\|\hat{v}_k\|} \quad (4)$$

wherein, $v_k$ denotes the singular vector of the channel vector (matrix) $h_k$ corresponding to the $k^{th}$ UE; $v_k^H$ is conjugate transpose of $v_k$.

In embodiments of the present invention, through calculating the estimated CQI value corresponding to the $k^{th}$ UE according to the equation (1) or (3), not only the impact of the precoding vector (matrix) on the multi-user interference but also the impact of the quantization error on the CQI are considered. Therefore, compared with the conventional method, the estimated CQI value calculated by the equation (1) or (3) is closer to the real CQI of the $k^{th}$ UE.

Figure 2:
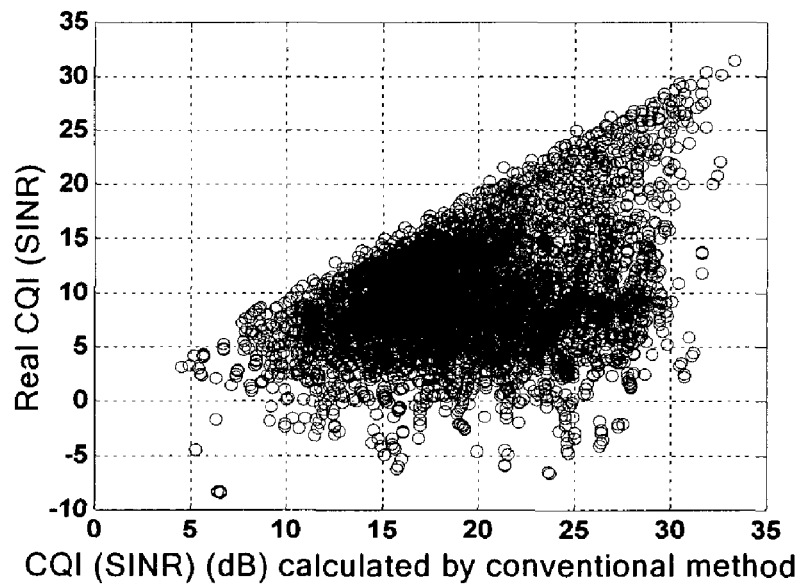
FIG. 2 shows a statistical distribution of real CQI and estimated CQI value obtained by a conventional method.

FIG. 2 shows a statistical distribution of real CQI and estimated CQI value obtained by the conventional method. The abscissa denotes UE's CQI estimated by the conventional method and the ordinate denotes UE's real CQI.

Figure 3:
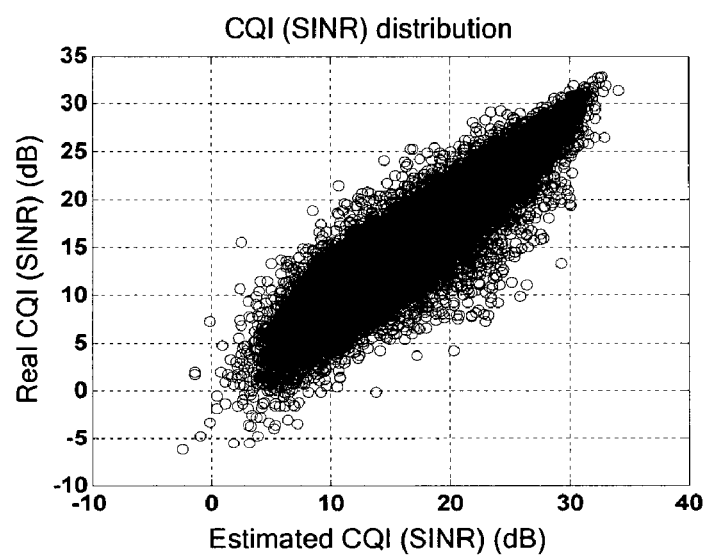
FIG. 3 shows a statistical distribution of real CQI and estimated CQI value obtained by a method of an embodiment of the present invention.

FIG. 3 shows a statistical distribution of real CQI and estimated CQI value obtained by a method of an embodiment of the present invention. The abscissa denotes the UE's CQI estimated by the method of an embodiment of the present invention and the ordinate denotes the UE's real CQI.

As can be seen from FIG. 2 and FIG. 3, compared with the conventional method, the method in this embodiment makes the UE's CQI obtained by the base station much closer to the real CQI corresponding to the UE.

In order to obtain a more precise estimated CQI value, after step 102, the base station may further update the estimated CQI value obtained in step 102 according to the statistical distribution of the real CQI and the corresponding estimated CQI value. Thus, the method may further include:

Step 103: Generate a statistical distribution of the real CQI and the corresponding estimated CQI value according to real channel information.

FIG. 3 shows an exemplary statistical distribution of the real CQI and the corresponding estimated CQI value.

Step 104: Obtain a Cumulative Distribution Function (CDF) of a real CQI corresponding to each estimated CQI value according to the statistical distribution of the real CQI and the corresponding estimated CQI value.

Figure 4:
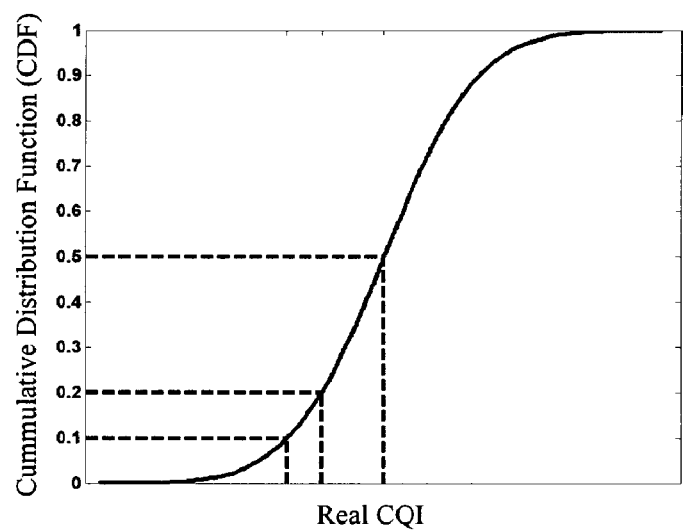
FIG. 4 illustrates a cumulative distribution function curve of a real CQI corresponding to an estimated CQI value.

FIG. 4 illustrates a CDF curve of a real CQI corresponding to an estimated CQI value. As can be seen from FIG. 4, a probability that the real CQI corresponding to the estimated CQI value is smaller than a is 0.1, a probability that the real CQI corresponding to the estimated CQI value is smaller than b is 0.2, and a probability that the real CQI corresponding to the estimated CQI value is smaller than c is 0.5.

Step 105: As to each estimated CQI value, select a real CQI corresponding to a given probability from the CDF of the real CQI corresponding to the estimated CQI value as an updated CQI value of the estimated CQI value. Then, obtain a corresponding relationship between each estimated CQI value and the updated CQI value of the estimated CQI value.

For example, as shown in FIG. 4, if the given probability is 0.1 (i.e. 10%), the updated CQI value of the estimated CQI value is a; if the given probability is 0.2 (i.e. 20%), the updated CQI value of the estimated CQI value is b; if the given probability is 0.5 (i.e. 50%), the updated CQI value of the estimated CQI value is c. According to an embodiment of the present invention, the given probability may be set as a value which is obtained by statistical collection and can make the updated CQI value closest to the real CQI value, e.g. set as 0.2 (i.e. 20%).

Step 106: According to the corresponding relationship between each estimated CQI value and the corresponding updated CQI value, obtain an updated CQI value corresponding to the real CQI value obtained in step 102.

It should be noted that, in practical applications, through steps 103 to 105, the base station may obtain the corresponding relationship between each estimated CQI value and a corresponding updated CQI value. Then, the base station creates a look-up table of the estimated CQI value to the updated CQI value according to the corresponding relationship between each estimated CQI value and the corresponding updated CQI value, and may find an updated CQI value corresponding to each estimated CQI value taking an estimated CQI value as an index. In other words, the base station may create the look-up table of the estimated CQI value to the updated CQI value according to statistical distribution of real CQI and corresponding estimated CQI value. Thus, after obtaining an estimated CQI value of each UE, the base station may find an updated CQI value corresponding to the estimated CQI value of each UE directly from the look-up table without performing the above steps 103 to 105 every time. In addition, the base station may find the updated CQI value corresponding to the estimated CQI value of each UE from the look-up table using a linear interpolation method or non-linear interpolation method.

Through the above steps 103 to 106, the base station further updates the estimated CQI value according to the statistical distribution of CQI to obtain an updated CQI value which is closer to the real CQI. Furthermore, in subsequent applications, the base station may perform UE scheduling using the updated CQI value which is closer to the real CQI and select a precise MSC, so as to further increase throughput of the system.

Figure 5:
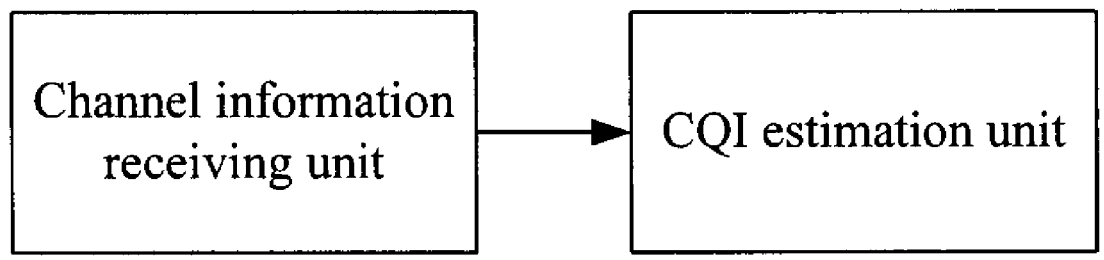
FIG. 5 is a schematic diagram illustrating an internal structure of a base station according to an embodiment of the present invention.

An embodiment of the present invention further provides a base station for implementing the above method. As shown in FIG. 5, the base station mainly includes:

a channel information receiving unit, adapted to receive quantized channel information, quantization error, ICI power and noise power which are fed back by each UE; and a CQI estimation unit, adapted to estimate a CQI corresponding to each UE according to the quantized channel information, the quantization error, the ICI power and the noise power fed back by each UE as well as an instantaneous precoding vector (matrix) of each UE, and obtain an estimated CQI value corresponding to each UE.

In the embodiment of the present invention, the CQI estimation unit may obtain the estimated CQI value corresponding to each UE according to the above equation (1) or (3).

The base station may further include a CQI update unit, adapted to obtain an updated CQI value according to a statistical distribution of real CQI and corresponding estimated CQI value.

According to an embodiment of the present invention, the CQI update unit specifically includes:

a statistical module, adapted to generate the statistical distribution of the real CQI and the corresponding estimated CQI value according to real channel information, respectively obtain a CDF of a real CQI corresponding to each estimated CQI value;

a setting module, adapted to select a real CQI corresponding to a given probability from the CDF of a real CQI corresponding to each estimated CQI value, take the selected real CQI as an updated CQI value of the estimated CQI value, and obtain a corresponding relationship between each estimated CQI value and the corresponding updated CQI value; and an updated CQI value determining module, adapted to obtain the updated CQI value corresponding to the estimated CQI value outputted by the CQI estimation unit according to the corresponding relationship between each estimated CQI value and the corresponding updated CQI value in the setting module.

According to another embodiment of the present invention, the CQI update unit includes:

a look-up table creating module, adapted to create a look-up table of the estimated CQI value to the updated CQI value according to the statistical distribution of the real CQI and the corresponding estimated CQI value; and an updated CQI value determining module, adapted to find the updated CQI value corresponding to the estimated CQI value of each UE from the look-up table.

Herein, the look-up table creating module may create a corresponding relationship between each estimated CQI value and the corresponding updated CQI value through the above steps 103 to 105, and create the look-up table of the estimated CQI value to the updated CQI value according to the corresponding relationship between each estimated CQI value and the corresponding updated CQI value. In addition, the updated CQI value determining module may find the updated CQI value corresponding to the estimated CQI value of each UE from the look-up table using a linear interpolation method or a non-linear interpolation method.

As can be seen from the above embodiments, when estimating a CQI corresponding to each UE, the CQI estimation unit not only considers the impact of the quantization error on the CQI estimation but also considers the impact of the pre-coding vector (matrix) of each UE on the multi-user interference. Therefore, compared with the conventional method, the estimated CQI value obtained by the CQI estimation unit is closer to the real CQI of each UE. In addition, through updating the estimated CQI value by the CQI update unit according to the statistical distribution of the real CQI and the corresponding estimated CQI value, the updated CQI value obtained is closer to the real CQI. Thus, in the subsequent process, the base station can select a precise MCS for each UE using the estimated CQI value which is closer to the real CQI.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. A method for obtaining Channel Quality Indicator (CQI) information, comprising:

receiving, by a base station, quantized channel information, quantization error, Inter-Cell Interference (ICI) power and noise power fed back by each User Equipment (UE) after channel estimation; and estimating, by the base station, a CQI corresponding to each UE to obtain an estimated CQI value corresponding to the UE according to the quantized channel information, the quantization error, the ICI power and the noise power which are fed back by the UE as well as an instantaneous precoding vector of each UE;

wherein the quantized channel information is a quantized channel vector or a quantized channel matrix;

the base station estimates the CQI corresponding to the UE according to an equation of:

$$CQI_k = \frac{\|\hat{h}_k \cdot w_k\|^2}{ICI + \sigma^2 + \|\hat{h}_k\|^2 \sum_{i \neq k}^{K} \|w_i\|^2 \sin^2 \theta_k}$$

wherein $CQI_k$ denotes an estimated CQI value corresponding to a $k^{th}$ UE; $\hat{h}_k$ denotes a quantized channel vector of the $k^{th}$ UE; $w_k$ denotes a precoding vector or a precoding matrix of the $k^{th}$ UE; ICI denotes inter-cell interference power fed back by the $k^{th}$ UE; $\sigma^2$ denotes noise power fed back by the $k^{th}$ UE; $\theta_k$ denotes a channel quantization error angle fed back by the $k^{th}$ UE; and K denotes the total number of UEs.

2. The method of claim 1, wherein the quantized channel information, the quantization error, the ICI power and the noise power are fed back to the base station by each UE through a physical uplink control channel or a physical uplink shared channel.

3. The method of claim 2, further comprising:
updating the estimated CQI value of each UE according to a statistical distribution of a real CQI and the estimated CQI value.

4. The method of claim 1, further comprising:
updating the estimated CQI value of each UE according to a statistical distribution of a real CQI and the estimated CQI value.

5. A method for obtaining Channel Quality Indicator (CQI) information, comprising:
receiving, by a base station, quantized channel information, quantization error, Inter-Cell Interference (ICI) power and noise power fed back by each User Equipment (UE) after channel estimation; and
estimating, by the base station, a CQI corresponding to each UE to obtain an estimated CQI value corresponding to the UE according to the quantized channel information, the quantization error, the ICI power and the noise power which are fed back by the UE as well as an instantaneous precoding vector of each UE;
wherein the quantized channel information is a quantized channel singular vector or a quantized singular matrix;
the base station estimates the CQI corresponding to the UE according to a equation of:

$$CQI_k = \frac{\lambda_k^2 \cdot \|\hat{v}_k \cdot w_k\|^2}{ICI + \sigma^2 + \sum_{i \neq k}^{K} \|w_i\|^2 \sin^2 \theta_k}$$

wherein $CQI_k$ denotes an estimated CQI value corresponding to the kth UE; $\hat{v}_k$ denotes a quantized singular vector of a channel vector $h_k$ corresponding to the $k^{th}$ UE; $\lambda_k$ denotes a singular value corresponding to the $k^{th}$ UE; $w_k$ denotes a precoding vector or a precoding matrix of the $k^{th}$ UE; ICI denotes inter-cell interference power fed back by the $k^{th}$ UE; $\sigma^2$ denotes noise power fed back by the $k^{th}$ UE; $\theta_k$ denotes a channel quantization error angle fed back by the $k^{th}$ UE; and K denotes the total number of UEs.

6. The method of claim 5, further comprising:
updating the estimated CQI value of each UE according to a statistical distribution of a real CQI and the estimated CQI value.

7. A method for obtaining Channel Quality Indicator (CQI) information, comprising:
receiving, by a base station, quantized channel information, quantization error, Inter-Cell Interference (ICI) power and noise power fed back by each User Equipment (UE) after channel estimation; and
estimating, by the base station, a CQI corresponding to each UE to obtain an estimated CQI value corresponding to the UE according to the quantized channel information, the quantization error, the ICI power and the noise power which are fed back by the UE as well as an instantaneous precoding vector of each UE;
updating the estimated CQI value of each UE according to a statistical distribution of a real CQI and the estimated CQI value;
wherein the updating of the estimated CQI value of each UE comprises:
generating the statistical distribution of the real CQI and the estimated CQI value according to real channel information;
obtaining a cumulative distribution function of a real CQI corresponding to each estimated CQI value according to the statistical distribution of the real CQI and the estimated CQI value;
selecting a real CQI corresponding to a given probability from the cumulative distribution function of the real CQI corresponding to each estimated CQI value, taking the selected real CQI as an updated CQI value of the estimated CQI value, and obtaining a corresponding relationship between each estimated CQI value and a corresponding updated CQI value;
obtaining the updated CQI value corresponding to the estimated CQI value of each UE according to the corresponding relationship between each estimated CQI value and the corresponding updated CQI value.

8. A method for obtaining Channel Quality Indicator (CQI) information, comprising:
receiving, by a base station, quantized channel information, quantization error, Inter-Cell Interference (ICI) power and noise power fed back by each User Equipment (UE) after channel estimation; and
estimating, by the base station, a CQI corresponding to each UE to obtain an estimated CQI value corresponding to the UE according to the quantized channel information, the quantization error, the ICI power and the noise power which are fed back by the UE as well as an instantaneous precoding vector of each UE;
creating, by the base station, a look-up table of the estimated CQI value to an updated CQI value according to the statistical distribution of the real CQI and the corresponding estimated CQI value;
wherein the update of the estimated CQI value comprises:
finding the updated CQI value corresponding to the estimated CQI value of each UE from the look-up table;
wherein the creating the look-up table of the estimated CQI value to the updated CQI value comprises:
generating the statistical distribution of the real CQI and the corresponding estimated CQI value according to real channel information;
obtaining a cumulative distribution function of a real CQI corresponding to each estimated CQI value according to the statistical distribution of the real CQI and the corresponding estimated CQI value;
selecting a real CQI corresponding to a given probability from a cumulative distribution function of a real CQI corresponding to each estimated CQI value, taking the selected real CQI as the updated CQI value of the estimated CQI value, and obtaining a corresponding relationship between each estimated CQI value and a corresponding updated CQI value;

creating the look-up table according to the corresponding relationship between each estimated CQI value and a corresponding updated CQI value.

9. The method of claim 8, wherein the finding the updated CQI value corresponding to the estimated CQI value of each UE from the look-up table comprises:

finding the updated CQI value corresponding to the estimated CQI value of each UE from the look-up table by a linear interpolation method or a non-linear interpolation method.

10. A base station, comprising:

a channel information receiving unit, adapted to receive quantized channel information, quantization error, Inter-Cell Interference (ICI) power and noise power which are fed back by each User Equipment (UE); and a Channel Quality Indicator (CQI) estimation unit, adapted to estimate a CQI corresponding to each UE according to the quantized channel information, the quantization error, the ICI power and the noise power which are fed back by the UE as well as an instantaneous precoding vector or an instantaneous precoding matrix of each UE; and obtain an estimated CQI value corresponding to each UE;

wherein the quantized channel information is a quantized channel vector or a quantized channel matrix;

the CQI estimation unit is further adapted to estimate the CQI corresponding to the UE according to an equation of:

$$CQI_k = \frac{\lambda_k^2 \cdot \|\hat{v}_k \cdot w_k\|^2}{ICI + \sigma^2 + \sum_{i=k}^{K} \|w_i\|^2 \sin^2 \theta_k}$$

wherein $CQI_k$ denotes an estimated CQI value corresponding to a $k^{th}$ UE; $\hat{h}_k$ denotes a quantized channel vector of the $k^{th}$ UE; $w_k$ denotes a precoding vector or a precoding matrix of the $k^{th}$ UE; ICI denotes inter-cell interference power fed back by the $k^{th}$ UE; $\sigma^2$ denotes noise power fed back by the $k^{th}$ UE; $\theta_k$ denotes a channel quantization error angle fed back by the $k^{th}$ UE; and K denotes the total number of UEs.

11. The base station of claim 10, further comprising:

a CQI update unit, adapted to obtain an updated CQI value according to a statistical distribution of a real CQI and a corresponding estimated CQI value.

12. A base station, comprising:

a channel information receiving unit, adapted to receive quantized channel information, quantization error, Inter-Cell Interference (ICI) power and noise power which are fed back by each User Equipment (UE); and a Channel Quality Indicator (CQI) estimation unit, adapted to estimate a CQI corresponding to each UE according to the quantized channel information, the quantization error, the ICI power and the noise power which are fed back by the UE as well as an instantaneous precoding vector or an instantaneous precoding matrix of each UE; and obtain an estimated CQI value corresponding to each UE;

a CQI update unit, adapted to obtain an updated CQI value according to a statistical distribution of a real CQI and a corresponding estimated CQI value;

wherein the CQI update unit comprises:

a statistical module, adapted to generate the statistical distribution of the real CQI and the corresponding estimated CQI value according to real channel information, obtain a cumulative distribution function of a real CQI corresponding to each estimated CQI value;

a setting module, adapted to select a real CQI corresponding to a given probability from the cumulative distribution function of a real CQI corresponding to each estimated CQI value, take the selected real CQI as the updated CQI value of the estimated CQI value, and obtain a corresponding relationship between each estimated CQI value and the corresponding updated CQI value; and an updated CQI value determining module, adapted to obtain the updated CQI value corresponding to the estimated CQI value outputted by the CQI estimation unit according to the corresponding relationship between each estimated CQI value and the corresponding updated CQI value in the setting module.

13. A base station, comprising:

a channel information receiving unit, adapted to receive quantized channel information, quantization error, Inter-Cell Interference (ICI) power and noise power which are fed back by each User Equipment (UE); and a Channel Quality Indicator (CQI) estimation unit, adapted to estimate a CQI corresponding to each UE according to the quantized channel information, the quantization error, the ICI power and the noise power which are fed back by the UE as well as an instantaneous precoding vector or an instantaneous precoding matrix of each UE; and obtain an estimated CQI value corresponding to each UE;

a CQI update unit, adapted to obtain an updated CQI value according to a statistical distribution of a real CQI and a corresponding estimated CQI value;

wherein the CQI update unit comprises:

a look-up table creating module, adapted to create a look-up table of the estimated CQI value to the updated CQI value according to the statistical distribution of a real CQI and a corresponding estimated CQI value; and an updated CQI value determining module, adapted to find the updated CQI value corresponding to the estimated CQI value of each UE from the look-up table;

wherein the look-up table creating module is further adapted to generate the statistical distribution of the real CQI and the corresponding estimated CQI value according to real channel information, obtain a cumulative distribution function of a real CQI corresponding to each estimated CQI value according to the statistical distribution of the real CQI and the corresponding estimated CQI value, select a real CQI corresponding to a given probability from a cumulative distribution function of a real CQI corresponding to each estimated CQI value, take the selected real CQI as the updated CQI value of the estimated CQI value, and obtain a corresponding relationship between each estimated CQI value and a corresponding updated CQI value, create the look-up table according to the corresponding relationship between each estimated CQI value and a corresponding updated CQI value.

14. A base station, comprising:

a channel information receiving unit, adapted to receive quantized channel information, quantization error, Inter-Cell Interference (ICI) power and noise power which are fed back by each User Equipment (UE); and a Channel Quality Indicator (CQI) estimation unit, adapted to estimate a CQI corresponding to each UE according to the quantized channel information, the quantization error, the ICI power and the noise power which are fed back by the UE as well as an instantaneous precoding vector or an instantaneous precoding matrix of each UE; and obtain an estimated CQI value corresponding to each UE; wherein the quantized channel information is a quantized channel vector or a quantized channel matrix;

wherein the quantized channel information is a quantized channel singular vector or a quantized singular matrix; the base station estimates the CQI corresponding to the UE according to a equation of:

$$CQI_k = \frac{\lambda_k^2 \cdot \|\hat{v}_k \cdot w_k\|^2}{ICI + \sigma^2 + \sum_{i=k}^{K} \|w_i\|^2 \sin^2 \theta_k}$$

wherein $CQI_k$ denotes an estimated CQI value corresponding to the kth UE; $\hat{v}_k$ denotes a quantized singular vector of a channel vector $h_k$ corresponding to the $k^{th}$ UE; $\lambda_k$ denotes a singular value corresponding to the $k^{th}$ UE; $w_k$ denotes a precoding vector or a precoding matrix of the $k^{th}$ UE; ICI denotes inter-cell interference power fed back by the $k^{th}$ UE; $\sigma^2$ denotes noise power fed back by the $k^{th}$ UE; $\theta_k$ denotes a channel quantization error angle fed back by the $k^{th}$ UE; and K denotes the total number of UEs.

* * * * *